United States Patent
Fukuda (10) Patent No.: US 7,664,478 B2
(45) Date of Patent: Feb. 16, 2010

(54) DC OFFSET CANCEL CONTROL METHOD AND TRANSMITTER/RECEIVER

(75) Inventor: Yohsuke Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 11/364,328

(22) Filed: Mar. 1, 2006

(65) Prior Publication Data

US 2006/0205351 A1    Sep. 14, 2006

(30) Foreign Application Priority Data

Mar. 14, 2005    (JP) .............................. 2005-070709

(51) Int. Cl.
    $H04B\ 1/10$    (2006.01)
(52) U.S. Cl. .................. 455/296; 455/343.2; 455/114.2
(58) Field of Classification Search .............. 455/114.2, 455/119, 230, 296, 334, 343.2, 343.3, 343.4, 455/343.5
See application file for complete search history.

(56) References Cited

U.S. PATENT DOCUMENTS

| | | | |
|---|---|---|---|
| 5,657,326 A * | 8/1997 | Burns et al. .................. | 370/349 |
| 6,639,909 B1 | 10/2003 | Sakuma | |
| 6,731,687 B1 * | 5/2004 | Lueker ........................ | 375/257 |
| 7,187,916 B2 * | 3/2007 | Mo et al. ..................... | 455/323 |
| 2006/0098605 A1 * | 5/2006 | Li ............................... | 370/338 |

* cited by examiner

*Primary Examiner*—Nguyen Vo
*Assistant Examiner*—Christian A. Hannon
(74) *Attorney, Agent, or Firm*—Foley & Lardner LLP (57) ABSTRACT

Disclosed is a transmitter/receiver which performs transmitting and receiving operations based on CSMA/CA (Carrier Sense Multiple Access with Collision Avoidance) system. The transmitter/receiver includes a first unit, a second unit and a DC offset control unit. The first unit obtains a DC offset value generated in the transmitter/receiver and holds the obtained DC offset value. The second unit removes the held DC offset value from received data. The DC offset control unit causses the first unit to operate upon response to at least one of transmission completion and reception completion.

4 Claims, 6 Drawing Sheets

DC OFFSET CANCEL CONTROL METHOD AND TRANSMITTER/RECEIVER

BACKGROUND OF THE INVENTION

1. Field of the Invention

The present invention relates to a DC offset canceling control method which obtains a DC offset value generated in a transmitter/receiver, holds the obtained DC offset value therein, and removes it from received data, and a transmitter/receiver using the same method.

2. Description of the Related Art

A receiver that receives data has conventionally included a DC offset cancel circuit. The DC offset cancel circuit removes a DC offset value that has got mixed in with received data at each part in the receiver to reduce an error rate of the received data. U.S. Pat. No. 6,639,909 (document 1), for example, describes a receiver including such a DC offset cancel circuit.

The receiver described in the document 1 receives a signal of time division multiple access (TDMA) system.

Then, the DC offset cancel circuit turns off a power supply of a mixer within a guard time period between transmitted and received bursts, obtains a DC offset value generated in the receiver located at the post stage of the mixer, and holds the obtained value. During a period of detecting the DC offset value, the transmitter/receiver can neither transmit nor receive data. The DC offset cancel circuit subtracts the held value from the received data.

However, the technology described in the document 1, which is related to a receiver for receiving a signal of time division multiple access (TDMA) system, cannot directly be applied to a transmitter/receiver in a packet switching system, which uses CSMA/CA (carrier sense multiple access with collision avoidance).

The receiver receiving a TDMA based signal detects a guard time period between transmitted and received bursts on the basis of a frame synchronization signal contained in the received signal.

However, in the packet switching system for transmitting and receiving a CSMA/CA based signal, a transmitter/receiver checks (carrier sense) a carrier usage prior to data transmission. When the carrier is not in use (idle), the transmitter/receiver transmits data according to a priority level of each data in a data group to be transmitted. When the carrier is in use (busy), the transmitter/receiver postpones data transmission till the carrier becomes idle. In other words, since the CSMA/CA based signal does not contain the frame synchronizing signal, the transmitter/receiver based on CSMA/CA system cannot detect a time period corresponding to the guard time period of TDMA system.

SUMMARY OF THE INVENTION

A first exemplary feature of the invention provides a DC offset value canceling control technology which reliably obtains a DC offset value generated in a transmitter/receiver thereby to lessen deterioration of an error rate characteristic by exactly determining a time period corresponding to a guard time period of TDMA system in a packet switching system not necessarily having the guard time.

According to the first exemplary aspect of the invention, there is provided a transmitter/receiver which performs transmitting and receiving operations based on CSMA/CA (Carrier Sense Multiple Access with Collision Avoidance) system. The transmitter/receiver includes a first unit, a second unit and a DC offset control unit. The first unit obtains a DC offset value generated in the transmitter/receiver and holds the obtained DC offset value. The second unit removes the held DC offset value from received data. The DC offset control unit caussses the first unit to operate upon response to at least one of transmission completion and reception completion.

For example, the transmitter/receiver in the packet switching system using CSMA/CA system transmits data after performing a carrier sense. Further, the transmitter/receiver does not return an ACK (acknowledgement) response till a predetermined SIFS (short inter-frame space) time period (e.g. 16 μs) elapses from the completion of data reception. Accordingly, the transmitter/receiver performs neither the transmitting operation nor the receiving operation during at least the SIFS time period immediately after the completion of transmitting operation or receiving operation. Therefore, the transmitter/receiver can reliably obtain a DC offset value generated therein in a manner that the DC offset value is obtained upon completion of transmitting operation or receiving operation.

When the CSMA/CA based transmitter/receiver obtains a DC offset value upon the completion of transmitting operation, it is preferable to obtain the DC offset value within the SIFS time period.

The other features and aspects of the present invention will become apparent from the description of the preferred embodiments.

DETAILED DESCRIPTION OF THE PREFERRED EMBODIMENTS

Figure 1:
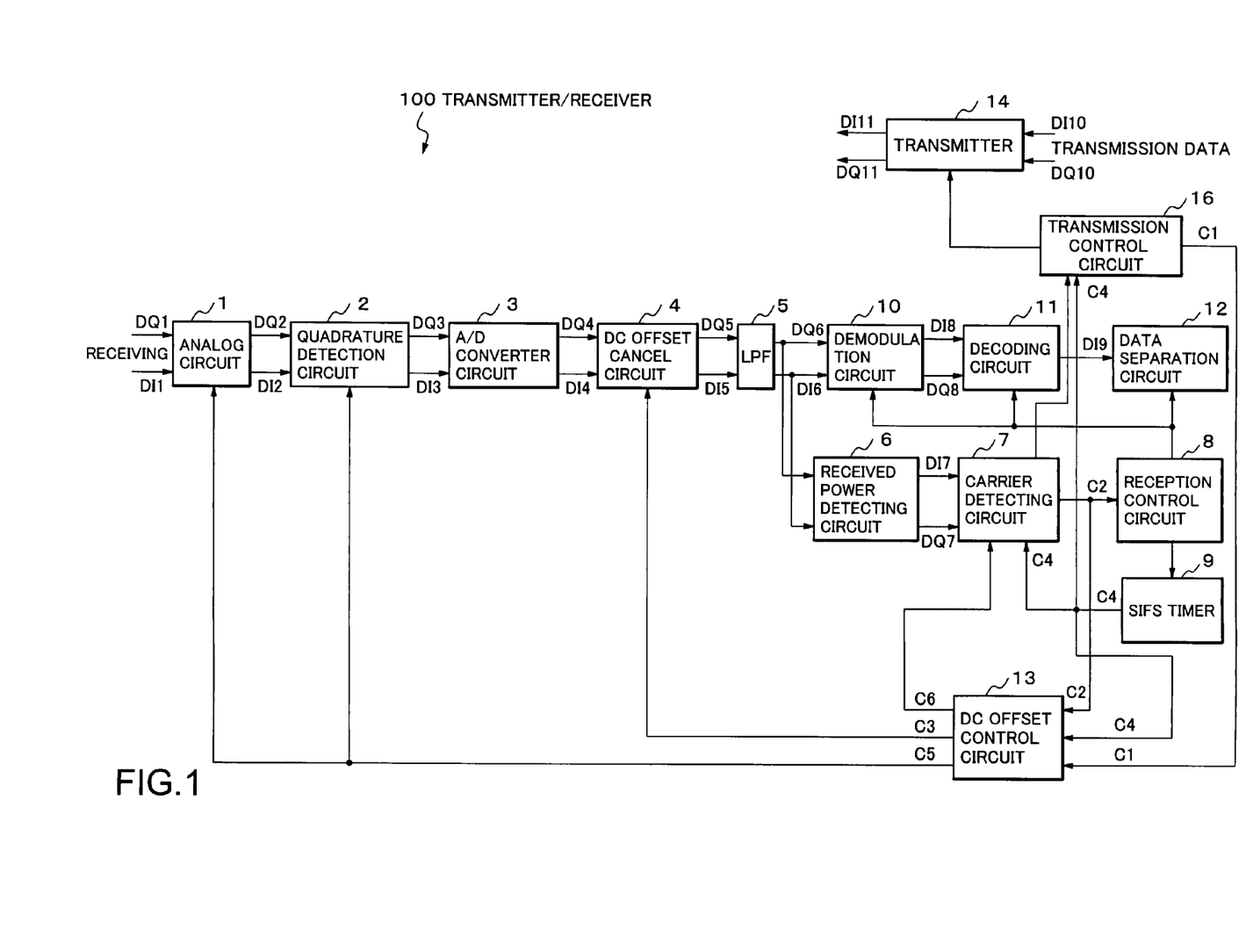
FIG. 1 is a block diagram showing an embodiment of a transmission/receiver according to the present invention.

Hereinafter, exemplary embodiments of present invention will be described in detail with reference to the accompanying drawings. FIG. 1 is a block diagram showing a configuration example of a transmitter/receiver to which a DC offset canceling control method according to the present invention is applied. This example is a transmitter/receiver in a packet switching system using CSMA/CA.

This transmitter/receiver 100 includes an analog circuit 1, a quadrature detection circuit 2, an A/D converter 3, a DC offset cancel circuit 4, a low-pass filter (LPF) 5, a received power detecting circuit 6, a carrier detection circuit 7, a reception control circuit 8, an SIFS timer 9, a demodulation circuit 10, a decoding circuit 11, a data separation circuit 12, a DC offset control circuit 13, a transmitter 14, and a transmission control circuit 16.

The transmitter/receiver 100 of FIG. 1 is characterized by including the DC offset cancel circuit 4 and the DC offset control circuit 13.

The DC offset cancel circuit 4 has a function of obtaining a DC offset value, a function of holding the obtained DC offset value, and a function of removing the held DC offset value from received data (output signal from the A/D converter 3).

The DC offset control circuit 13 receives a transmission enable signal (transmission status) C1 from the transmission control circuit 16, a carrier detection signal C2 from the carrier detection circuit 7, and a timer signal C4 from the SIFS timer 9. The DC offset control circuit 13 outputs a control signal C5 based these signals to forcibly turn off power supply to the analog circuit 1 and the quadrature detection circuit 2. Further, the DC offset control circuit 13 sends a control signal C3 to the DC offset cancel circuit 4 to cause the circuit to start operations of detecting and holding the DC offset value. The DC offset control circuit 13 also sends a control signal C6 to the carrier detection circuit 7 to forcibly turn on the carrier detection signal C2 (C2="0"→"1").

Figure 2:
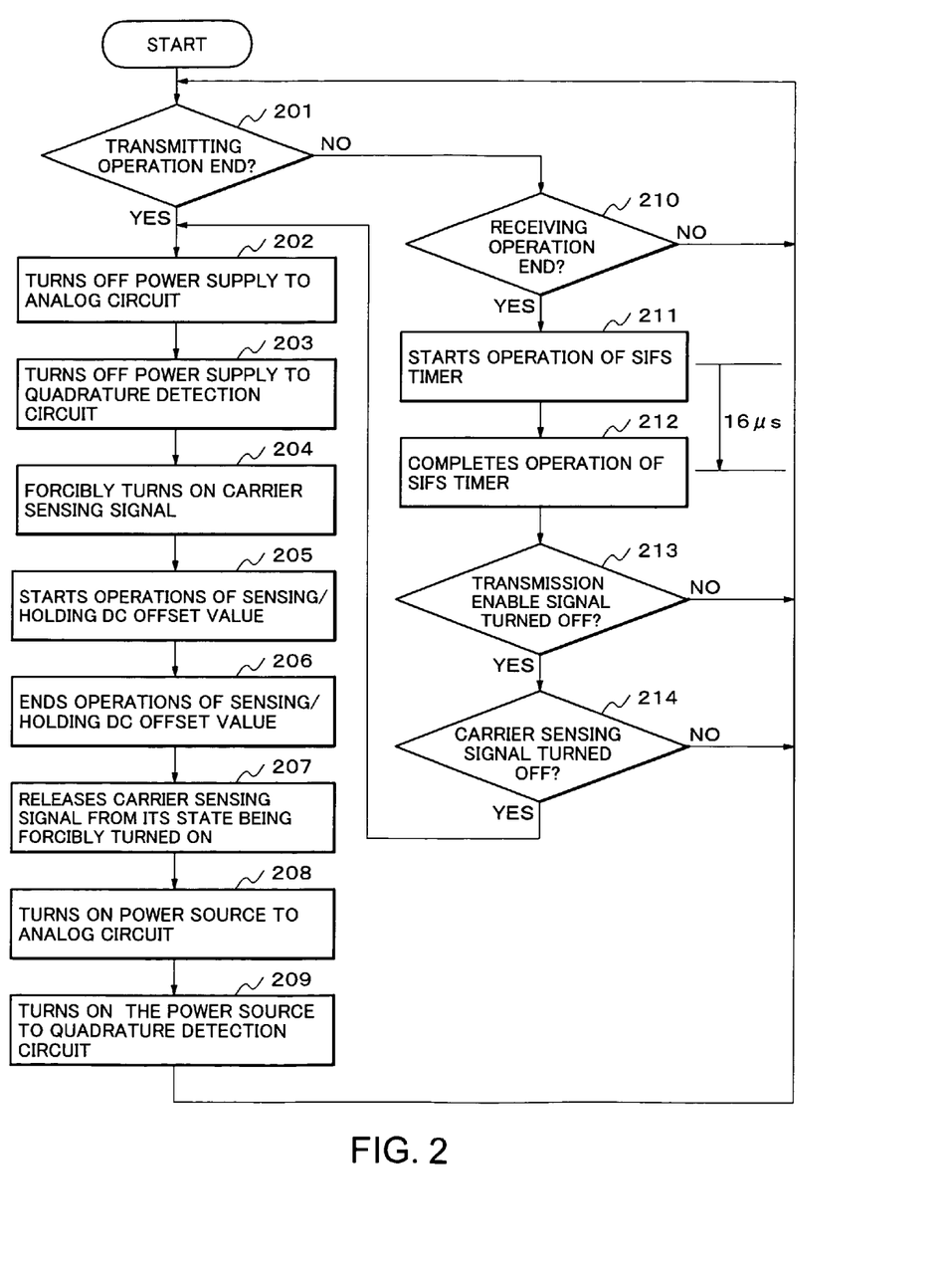
FIG. 2 is a flow chart showing an overall DC offset detection operation of the transmitter/receiver of FIG. 1.

FIG. 2 is a flow chart showing an overall DC offset detection operation of the transmitter/receiver 100. Details of the functions of the DC offset control circuit 13 will be described hereunder with reference to this FIG. 2.

[Upon Completion of Transmission]

When the transmitter 14 completes its transmitting operation, and the transmission enable signal C1 output from the transmission control circuit 16 turns off (C1="1" to "0") (YES in step 201), the DC offset control circuit 13 sends a control signal C5 to the analog circuit 1 and the quadrature detection circuit 2 to turn off the power supply to the analog circuit 1 and the quadrature detection circuit 2 (steps 202 and 203). As a result, no signal is input to the A/D converter 3.

Next, the DC offset control circuit 13 sends a control signal C6 to the carrier detection circuit 7 to forcibly turn on an output signal (carrier detection signal C2) of the carrier detection circuit 7 (step 204). Further, the DC offset control circuit 13 sends a control signal C3 to the DC offset cancel circuit 4 to cause the circuit to start operations of detecting and holding the DC offset value (step 205).

Thus, the present embodiment, after the completion of transmitting operation, forcibly places the transmitter/receiver in a pseudo-state that a carrier has been detected. The DC offset cancel circuit 4 obtains an output value of the A/D converter 3 as a DC offset value and holds the obtained DC offset value therein.

When the operations of detecting and holding the DC offset value are completed (step 206), the DC offset control circuit 13 releases the carrier detection signal C2 from its state being forcibly turned on (step 207). The DC offset control circuit 13 also turns on again the power to the analog circuit 1 and the quadrature detection circuit 2 (steps 208 and 209). When the step 209 ends, the transmitter/receiver returns to the step 201 in its operation.

[Upon Completion of Receiving Operation]

When detecting the completion of receiving operation (YES in step 210), the reception control circuit 8 instructs the SIFS timer 9 to start its timer operation. Accordingly, the SIFS timer 9 starts the timer operation of an SIFS time (16 μs in this example) (step 211), and an output signal (timer signal C4) of the SIFS timer 9 changes from "0" to "1".

Here, the term "SIFS time" is a waiting time period from the time upon data reception to the time when an ACK response (ACK frame) is returned to a transmitting source of the data. The SIFS time is shorter than a carrier sensing time just before the data is transmitted. Note that in the CSMA/CA system, the carrier sensing operation is performed when the data frame is sent, but it is not performed when the ACK frame is sent.

When the SIFS timer 9 completes the timer operation of the SIFS time (step 212), the timer signal C4 output from the SIFS timer 9 changes from "1" to "0". When the timer signal C4 from the SIFS timer 9 changes to "0", the transmission control circuit 16, when a received frame is a data frame, instructs the transmitter 14 to return an ACK frame to the transmitting source. In this case, a transmission enable signal C1 from the transmission control circuit 16 turns on ("0"→"1") before a timer signal C4 from the SIFS timer 9 falls, that is, before the SIFS timer 9 completes the timer operation of the SIFS time. During a period that the transmission enable signal C1 is in "1" state, the transmitter/receiver 100 is in the transmitting operation.

Meanwhile, when the timer signal C4 from the SIFS timer 9 changes to "0", the DC offset control circuit 13 checks the transmission enable signal C1 from the transmission control circuit 16 and the carrier detection signal C2 from the carrier detection circuit 7 (steps 213 and 214). If the transmission enable signal C1 and the carrier detection signal C2 are both in off state (YES in both steps 213 and 214), the transmitter/receiver 100 is neither in the transmitting operation nor in the carrier detection operation. In this case, a process similar to that at the completion of the transmitting operation is performed. That is, the processes from the steps 201 to 202 are performed.

Operation Example Upon Completion of Transmitting Operation

Figure 3:
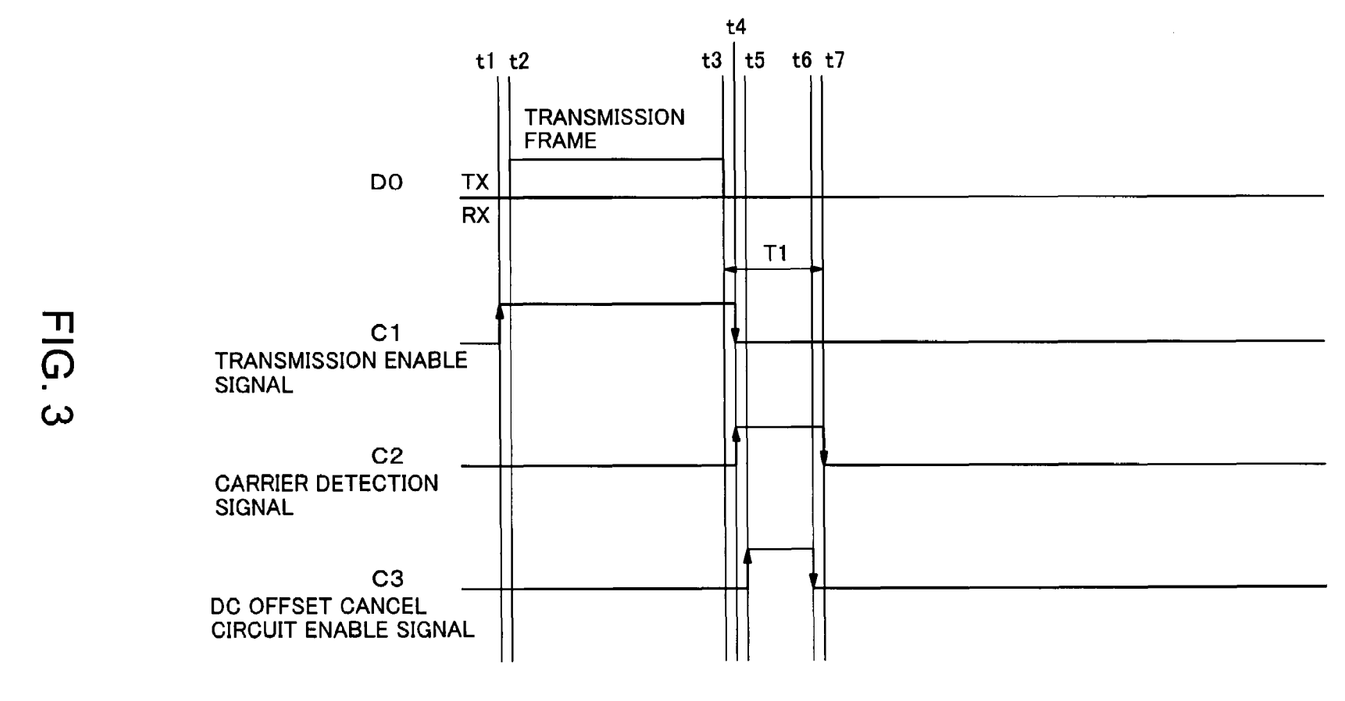
FIG. 3 is a timing chart for explaining an operation example at the completion of transmitting operation.

An operation example upon the completion of transmitting operation will be described with reference to FIG. 3. In FIG. 3, a horizontal axis represents time. In FIG. 3, "D0" indicates time period occupied by the transmission/reception frames propagating through a medium (air). "C1" indicates a transmission enable signal, and "C2" represents a carrier detection signal. "C3" indicates a control signal to the DC offset cancel circuit 4, which will be referred to as a "DC offset cancel circuit enable signal". Note that in the operation example, the frame of the transmission signal may be of any type. That is, in some case, the transmission frame is of the data frame type, and in another case, it is of the ACK frame type.

When the transmitting operation ends at time t3 and the transmission control circuit 16 turns off the transmission enable signal C1 at time t4, the power to the analog circuit 1 and the quadrature detection circuit 2 is turned off, and the carrier detection signal C2 from the carrier detection circuit 7 is forcibly turned on.

At time t5, the DC offset cancel circuit enable signal C3 is turned on, and the DC offset cancel circuit 4 starts the operations of detecting and holding the DC offset value.

When the detecting/holding operation ends at time t6, the DC offset cancel circuit enable signal C3 is turned off. Accordingly, at time t7 the carrier detection signal C2 is released from its state being forcibly turned on. Further, the power to the analog circuit 1 and the quadrature detection circuit 2 is turned on again. In this case, a time period T1 from a time that the transmitting operation ends to a time that the state of the carrier detection signal returns from forced on-state to off-state (a time taken for the operations of detecting and holding the DC offset value) is set within the SIFS time.

Operation Example 1 Upon Completion of Receiving Operation

An operation example 1 upon the completion of receiving operation will be described with reference to FIG. 4.

Figure 4:
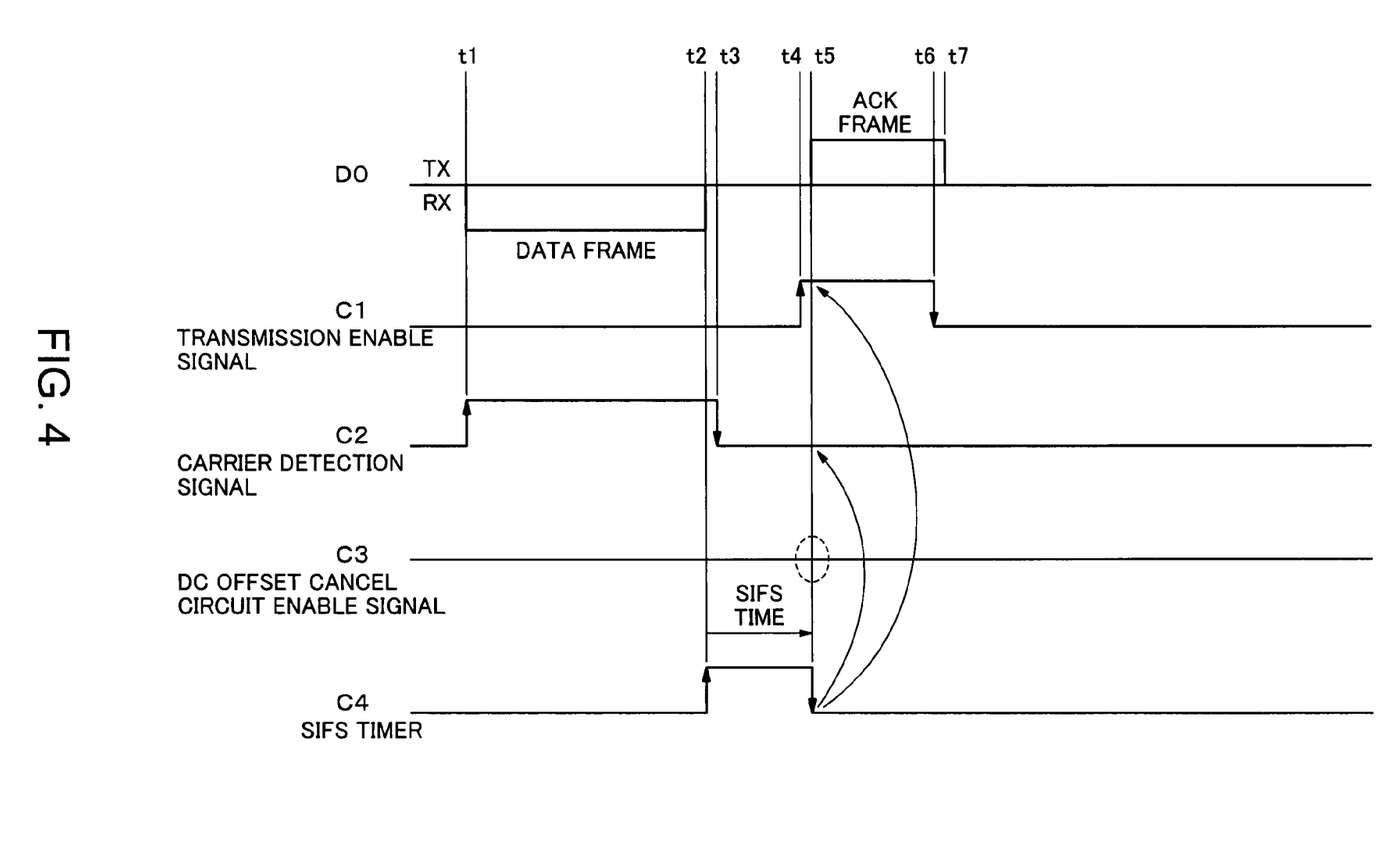
FIG. 4 is a timing chart for explaining an operation example 1 at the completion of receiving operation.

In FIG. 4, "DO" indicates a time zone occupied by a received frame, and a time zone occupied by an ACK frame that the transmitter/receiver transmits in response to the received frame. In FIG. 4, "C1" indicates a transmission enable signal, "C2", a carrier detection signal, "C3", a DC offset cancel circuit enable signal, and "C4", a timer signal output from the SIFS timer 9. In this example, a received signal takes the form of a data frame.

When reception of the data frame ends at time t2, the SIFS timer 9 starts the timer operation of the SIFS time (t2 in FIG. 4). After the SIFS time elapses (time t3 in FIG. 4), the DC offset control circuit 13 checks the transmission enable signal C1 and the carrier detection signal C2. In this example, the transmitter/receiver returns an ACK frame to the received data frame, and therefore the transmission enable signal C1 is in an on-state at the time point that the SIFS time has elapsed. Accordingly, the DC offset control circuit 13 determines that the transmitter/receiver 100 is in the transmitting operation, and does not turn on the DC offset cancel circuit enable signal C3. For this reason, the DC offset cancel circuit 4 does not detect and hold the DC offset value.

Operation Example 2 Upon Completion of Receiving Operation

Figure 5:
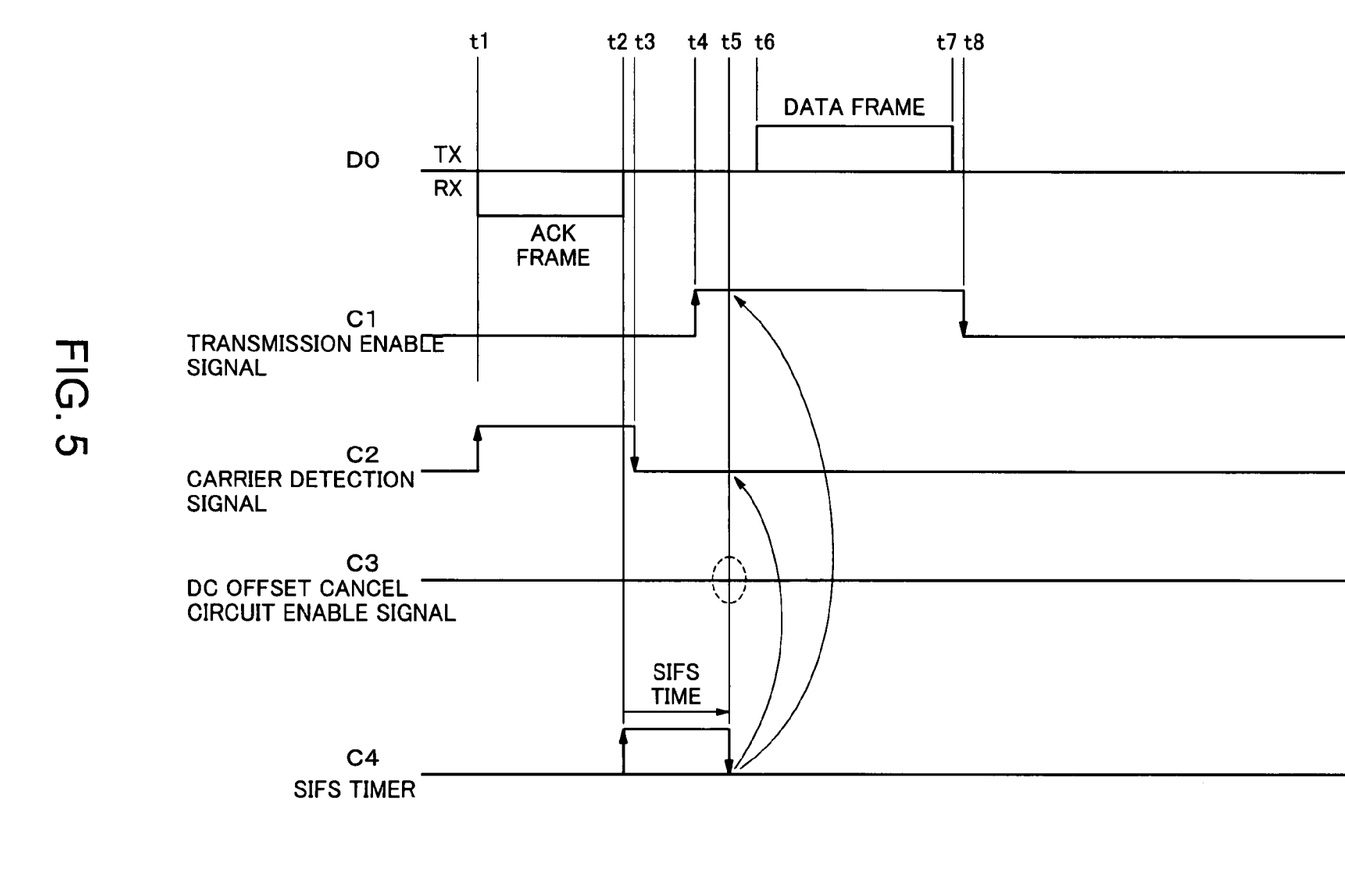
FIG. 5 is a timing chart for explaining an operation example 2 at the completion of receiving operation.

FIG. 5 is a timing chart showing an operation example 2 upon the completion of receiving operation. In this operation example 2, the received signal is of the ACK frame type. When reception of the ACK frame ends (time t2 in FIG. 5), the SIFS timer 9 starts the timer operation of the SIFS time. Then, after the SIFS time elapses (time t3 in FIG. 5), the DC offset control circuit 13 checks the transmission enable signal C1 and the carrier detection signal C2. In this example, after the reception of the ACK frame, the transmitter/receiver started the preparation for data frame transmission at time t4, and at the time point that the SIFS time has elapsed, the transmission enable signal C1 has been in an on state. Therefore, in this case, the DC offset control circuit 13 determines that the transmitter/receiver 100 is in the transmitting operation, and holds the DC offset cancel circuit enable signal C3 in an off-state. For this reason, the DC offset cancel circuit 4 does not detect and hold the DC offset value.

Operation Example 3 Upon Completion of Receiving Operation

Figure 6:
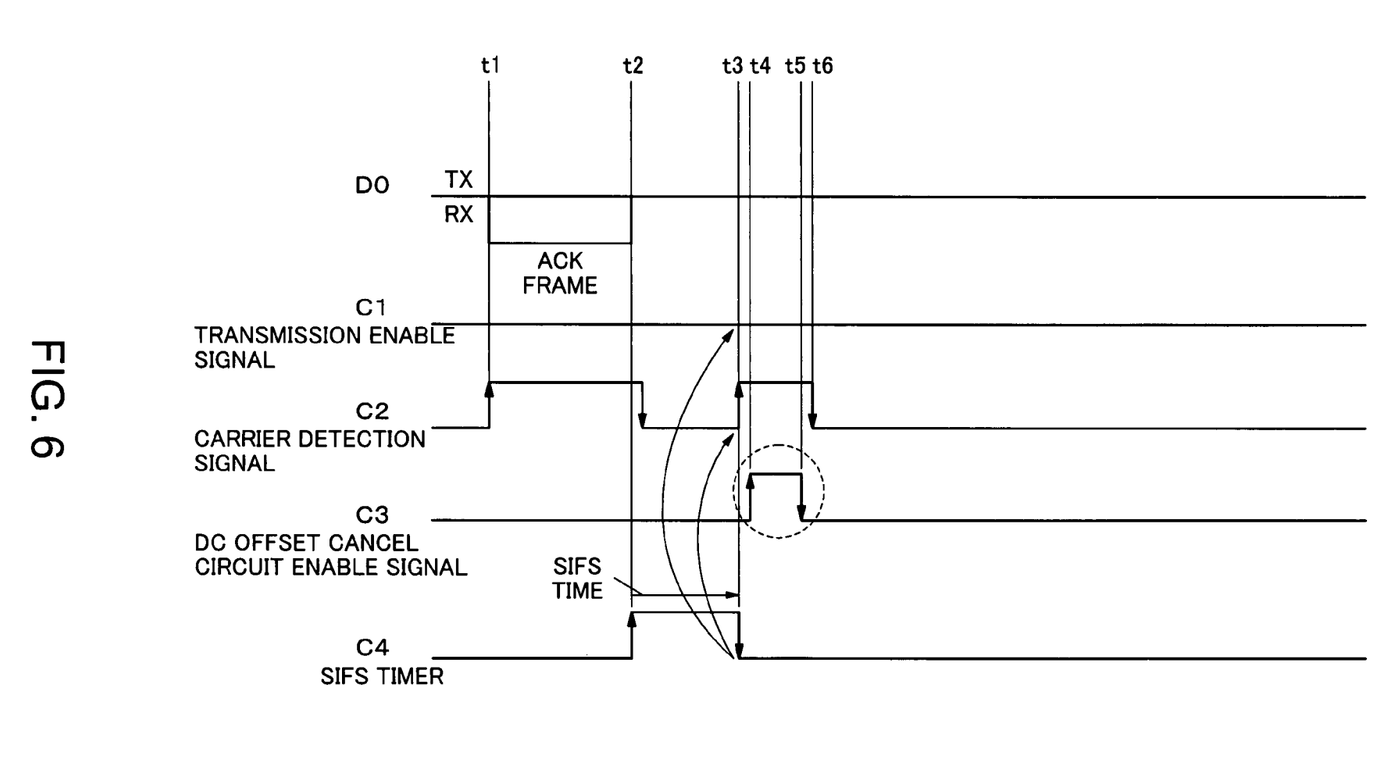
FIG. 6 is a timing chart for explaining an operation example 3 at the completion of receiving operation.

FIG. 6 is a timing chart showing an operation example 3 upon the completion of receiving operation. In the operation example 3, a signal to be received is of an ACK frame type. When the reception of the ACK frame ends (time t2 in FIG. 6), the SIFS timer 9 starts the timer operation of the SIFS time (t2 in FIG. 6(e)). Then, after the SIFS time elapses (time t3 in FIG. 6), the DC offset control circuit 13 checks the transmission enable signal C1 and the carrier detection signal C2. In this example, after receiving the ACK frame, the transmitter/receiver performs neither the transmitting operation nor the receiving operation. Accordingly, in this case, the DC offset control circuit 13 forcibly turns on the carrier detection signal C2 (time t3 in FIG. 6). Then, the DC offset control circuit 13 turns on the DC offset cancel circuit enable signal C3 (time t4 in FIG. 6), and causes the DC offset cancel circuit 4 to perform the operations of detecting and holding the DC offset value.

As is understood from the operation examples 1, 2 and 3 upon the completion of receiving operation, this embodiment is designed taking into account of the case that the operations of detecting and holding the DC offset value after the completion of the receiving operation take time longer than the SIFS time. Specifically, at the time point that the SIFS time has elapsed, the DC offset control circuit 13 checks the transmission enable signal C1 and the carrier detection signal C2. Then, when the transmission enable signal C1 and the carrier detection signal C2 are both in an off state, the DC offset control circuit 13 causes the DC offset cancel circuit 4 to perform the operations of detecting and holding the DC offset value.

If after the completion of receiving operation, the operations of detecting and holding the DC offset value end within the SIFS time, it may be designed such that the DC offset control circuit 13 causes the DC offset cancel circuit 4 to start the operations of detecting and holding the DC offset value, as in the case of after the completion of transmitting operation. However, because of processing delay and other factors that occur in the receiving operation, after the completion of receiving operation, there is a chance that the operations of detecting and holding the DC offset value fail to end within the SIFS time, and hence the detecting/holding operation collides with the transmitting operation or the receiving operation. Assuming that such a case may occur, in the embodiment already described, check is made of the transmission enable signal C1 and the carrier detection signal C2. Then, when the transmitter/receiver is neither in the transmitting operation nor in the carrier detecting operation (receiving operation), the DC offset control circuit 13 causes the DC offset cancel circuit 4 to perform the operations of detecting and holding the DC offset value. As a result, there is no chance of colliding of the detecting/holding operation with the transmitting operation or the receiving operation, and a DC offset value generated in the transmitter/receiver 100 can reliably be obtained.

Moreover, in the embodiment mentioned above, the DC offset value is obtained in both upon the completion of transmitting operation and upon the completion of receiving operation. However, the embodiment may be modified such that the DC offset value is obtained either upon the completion of transmitting operation or upon the completion of receiving operation.

Furthermore, instead of obtaining the DC offset value every time that the transmitting operation and/or the receiving operation end, the DC offset value may be obtained every time that a predetermined number of transmitting operations or receiving operations are performed. In other words, the embodiment may also be modified such that the operations of detecting and holding the DC offset value are performed at a certain frequency. Such a modification does not degrade the DC offset cancel capability since generally the DC offset value slowly varies with time.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and scope of the following claims. Further, the inventor's intent is to retain all equivalents even if the claims are amended during prosecution.

What is claimed is:

1. A DC offset value cancel control method comprising:
   a detecting/holding step of obtaining a DC offset value generated in a transmitter/receiver and holding the obtained DC offset value, and removing the held DC offset from received data;

a transmission completion detecting step of detecting the completion of transmitting operation performed by said transmitter/receiver;

a first control step of executing said detecting/holding step when said transmission completion detecting step detects the completion of transmitting operation;

a reception completion detecting step of detecting the completion of receiving operation performed by said transmitter/receiver; and a second control step of executing said detecting/holding step when said reception completion detecting step detects the completion of receiving operation, wherein said second control step executes said detecting/holding step after a predetermined time elapses, wherein said second control step checks a status of and a carrier detection signal in said transmitter/receiver after said predetermined time elapses, and executes said detecting/holding step when said transmitter/receiver is neither in a transmission state nor in a carrier detecting state.

2. The DC offset value cancel control method according to claim 1, wherein said predetermined time is a time period from a time that said transmitter/receiver completes the data reception to a time that said transmitter/receiver sends an acknowledgement (ACK).

3. A transmitter/receiver which comprises a detecting/holding means for obtaining a DC offset value generated therein and holding the obtained DC offset value, and removing the held DC offset value from received data, the transmitter/receiver comprising:

a transmission completion detecting means for detecting the completion of transmitting operation performed by said transmitter/receiver;

a first control means for driving said detecting/holding means when said transmission completion detecting means detects the completion of transmitting operation;

a reception completion detecting means for detecting the completion of receiving operation performed by said transmitter/receiver; and a second control means for driving said detecting/holding means when said reception completion detecting means detects the completion of receiving operation, wherein said second control means checks a status of and a carrier detection signal in said transmitter/receiver after said predetermined time elapses, and drives said detecting/holding means when said transmitter/receiver is neither in a transmission state nor in a carrier detecting state, and wherein said second control means checks a status of and a carrier detection signal in said transmitter/receiver after said predetermined time elapses, and drives said detecting/holding means when said transmitter/receiver is neither in a transmission state nor in a carrier detecting state.

4. The transmitter/receiver according to claim 3, wherein said predetermined time is a time period from a time that said transmitter/receiver completes the data reception to a time that said transmitter/receiver sends an acknowledgement (ACK).

* * * * *